United States Patent
Kogan-Katz et al.

(10) Patent No.: US 10,162,696 B2
(45) Date of Patent: Dec. 25, 2018

(54) DEPENDENCY MONITORING

(71) Applicant: Hewlett-Packard Development Company, L.P., Houston, TX (US)

(72) Inventors: Olga Kogan-Katz, Yehud (IL); Yair Horovitz, Mazkeret Batya (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 53 days.

(21) Appl. No.: 14/761,370

(22) PCT Filed: Jan. 31, 2013

(86) PCT No.: PCT/US2013/024154
§ 371 (c)(1),
(2) Date: Jul. 16, 2015

(87) PCT Pub. No.: WO2014/120207
PCT Pub. Date: Aug. 7, 2014

(65) Prior Publication Data
US 2015/0355959 A1    Dec. 10, 2015

(51) Int. Cl.
*G06F 11/00* (2006.01)
*G06F 11/07* (2006.01)
(Continued)

(52) U.S. Cl.
CPC ........ *G06F 11/0772* (2013.01); *G06F 11/076* (2013.01); *G06F 11/079* (2013.01);
(Continued)

(58) Field of Classification Search
CPC ........... G06F 11/0772; G06F 11/079; G06F 11/0751; G06F 11/076; G06F 11/0736;
(Continued)

(56) References Cited

U.S. PATENT DOCUMENTS

| 7,421,621 | B1 * | 9/2008 | Zambrana | G06F 11/3612 714/38.14 |
| 7,631,222 | B2 * | 12/2009 | Hasan | H04L 41/0631 714/26 |

(Continued)

OTHER PUBLICATIONS

Dictionary definition for "specification", retrieved from wikipedia: https://en.wikipedia.org/wiki/Specification_(technical_standard), on Jun. 21, 2017.*

(Continued)

*Primary Examiner* — Yair Leibovich (57) ABSTRACT

Dependency monitoring can include monitoring a first application and a second application for un-expected behavior. Dependency monitoring can also include receiving a description of a number of dependencies between a number of applications wherein the description of the number of dependencies is created before monitoring of the first application and the second application begins. Dependency monitoring can include sending a message to an information technology (IT) personnel, wherein the message identifies a dependency from the number of dependencies between the first application and the second application based on the description of the number of dependencies.

20 Claims, 5 Drawing Sheets

(51) Int. Cl.
*G06F 11/36* (2006.01)
*G06F 11/30* (2006.01)
*G06F 11/34* (2006.01)

(52) U.S. Cl.
CPC ...... *G06F 11/0736* (2013.01); *G06F 11/0751* (2013.01); *G06F 11/3636* (2013.01); *G06F 11/3003* (2013.01); *G06F 11/3082* (2013.01); *G06F 11/34* (2013.01); *G06F 2201/865* (2013.01)

(58) Field of Classification Search
CPC .. G06F 11/3636; G06F 11/3003; G06F 11/34; G06F 11/3082; G06F 2201/865
USPC ........................................................ 714/47.1
See application file for complete search history.

(56) References Cited

U.S. PATENT DOCUMENTS

| | | |
|---|---|---|
| 7,657,554 B2 | 2/2010 | Murphy et al. |
| 7,711,987 B2 | 5/2010 | Agarwal et al. |
| 8,132,180 B2 | 3/2012 | Agarwal et al. |
| 8,347,315 B1 * | 1/2013 | Leonard .................. H04L 67/34 707/999.1 |
| 2006/0041659 A1 * | 2/2006 | Hasan ................. H04L 41/0631 709/224 |
| 2006/0161892 A1 | 7/2006 | Anand et al. |
| 2008/0040364 A1 * | 2/2008 | Li .......................... G06Q 10/10 |
| 2008/0092136 A1 | 4/2008 | Pullara |
| 2008/0148231 A1 | 6/2008 | Weber |
| 2008/0201705 A1 | 8/2008 | Wookey et al. |
| 2008/0270515 A1 * | 10/2008 | Chen ..................... G06F 9/4856 709/202 |
| 2009/0113248 A1 * | 4/2009 | Bock ..................... G06F 11/079 714/39 |
| 2009/0210745 A1 | 8/2009 | Becker et al. |
| 2010/0281307 A1 * | 11/2010 | Ng ..................... G06F 11/0709 714/40 |
| 2012/0072884 A1 | 3/2012 | Balko et al. |

OTHER PUBLICATIONS

Dictionary definition for "software", retrieved from wikipedia: https://en.wikipedia.org/wiki/Software, on Jun. 21, 2017.*
International Search Report & Written Opinion received in PCT/US2013/024154, dated Oct. 28, 2013, 10 pages.
Zarpelao, B.B. et al., "Anomaly Detection Using DSNS and a Dependency Graph for SNMP Objects," (Research Paper), Fourth Advanced International Conference on Telecommunications, Jun. 8-13, 2008, pp. 56-63.

* cited by examiner

DEPENDENCY MONITORING

BACKGROUND

An application can be monitored. The monitoring of an application can reveal a number of errors. The errors can be corrected by information technology (IT) personnel. Identifying the errors based on the monitoring can consume IT personnel resources.

DETAILED DESCRIPTION

A number of applications can be associated with un-expected behavior. A number of events can be created based on the un-expected behavior. A portion of the number of events can be associated based on a dependency between the number of applications, a number of services, and/or a number of application components within an application, wherein a description of the dependencies is created during a design stage and/or during a development stage of an application. The association between a portion of the number of events can be sent to an information technology (IT) personnel who can use the association to resolve the un-expected behavior that caused the events.

As used herein, an application can be machine-readable instructions (MRI) that are composed of a number of application components, and that provide a number of services to a user. In a number of examples, a service can be provided using a service-oriented architecture (SOA) wherein a number of applications and/or a number of application components provide the service. A number of services can include external services provided to users and/or internal services provided to a number of other applications. For example, services can include database services that an application provides to a number of other applications. That is, a service can be dependent on a number of applications and/or on a number of application components.

As used herein, an application component can define a function, e.g., a service, associated with an application. A function associated with an application can include a service that an application provides to a user. An application that includes a number of application components can perform a number of functions that provide a number of services to a user. In a number of examples, the application components in an application can depend on each other.

An application can have an associated life cycle. A life cycle can describe a number of stages that the application goes through before the application can be used by a number of users. A life cycle of an application can include a design stage, a development stage, a testing stage, a distribution stage, among other stages.

An application can be associated with un-expected behavior and/or abnormal behavior. Un-expected behavior can include un-intended behavior of an application and/or an application component. Abnormal behavior can include behavior that is outside the scope of a predefined behavior. For example, an application that has a number of errors associated with the MRI can have un-intended behavior as a result of the errors. Un-intended behavior and/or abnormal behavior can be made manifest in a number of metrics that are monitored. The monitoring of the number of metrics that are associated with the applications can lead to the creation of a number of events. For example, if a performance threshold, e.g., metric, of a certain transaction defines that the transactions should be performed in under three seconds, then an event can be created, e.g., thrown, when the average response time is greater than three seconds. The number of events can be created when un-intended behavior and/or abnormal behavior is detected during a monitoring of the application.

As the number of events increase, the ability of IT personnel to identify the root cause of the un-expected behavior decreases. As used herein, a root cause of the un-expected behavior can be located in the MRI, a runtime configuration, and/or user error associated with an application. In a number of examples, an error in a first application can cause un-expected behavior in the first application and in a second application. An error in a first application component can cause an un-expected behavior in the first application component and in a second application component of an application. An error associated with a first service that is provided by a number of application components and/or applications can cause an un-expected behavior in the first application and in a second service. The events created based on the un-expected behavior of the first application, the second application, the first service, the second service, the first application component, and/or the second application component can be associated. That is, the resolution of a root cause of the un-expected behavior in the first application can resolve the un-expected behavior in the second application, the first service, the second service, the first application component, and/or the second application component.

IT personnel can address the un-expected behaviors, e.g., root cause of the un-expected behaviors, associated with a number of applications more effectively by grouping events than by addressing each event individually. The grouping of events can be based on a number of dependencies between a number of applications, a number of services, and/or between a number of components of an application. A description of a number of dependencies can provide IT personnel with the information needed to identify a root cause of a number of events. Descriptions of dependencies that are created at a design stage and a development stage, e.g., before monitoring, can be more accurate and can be more easily acquired than descriptions of dependencies that are created at runtime. As used herein, examples given for dependencies between different applications can also describe examples for dependencies between different service and/or different application components of an application.

In the present disclosure, reference is made to the accompanying drawings that form a part hereof, and in which is shown by way of illustration how a number of examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Figure 1:
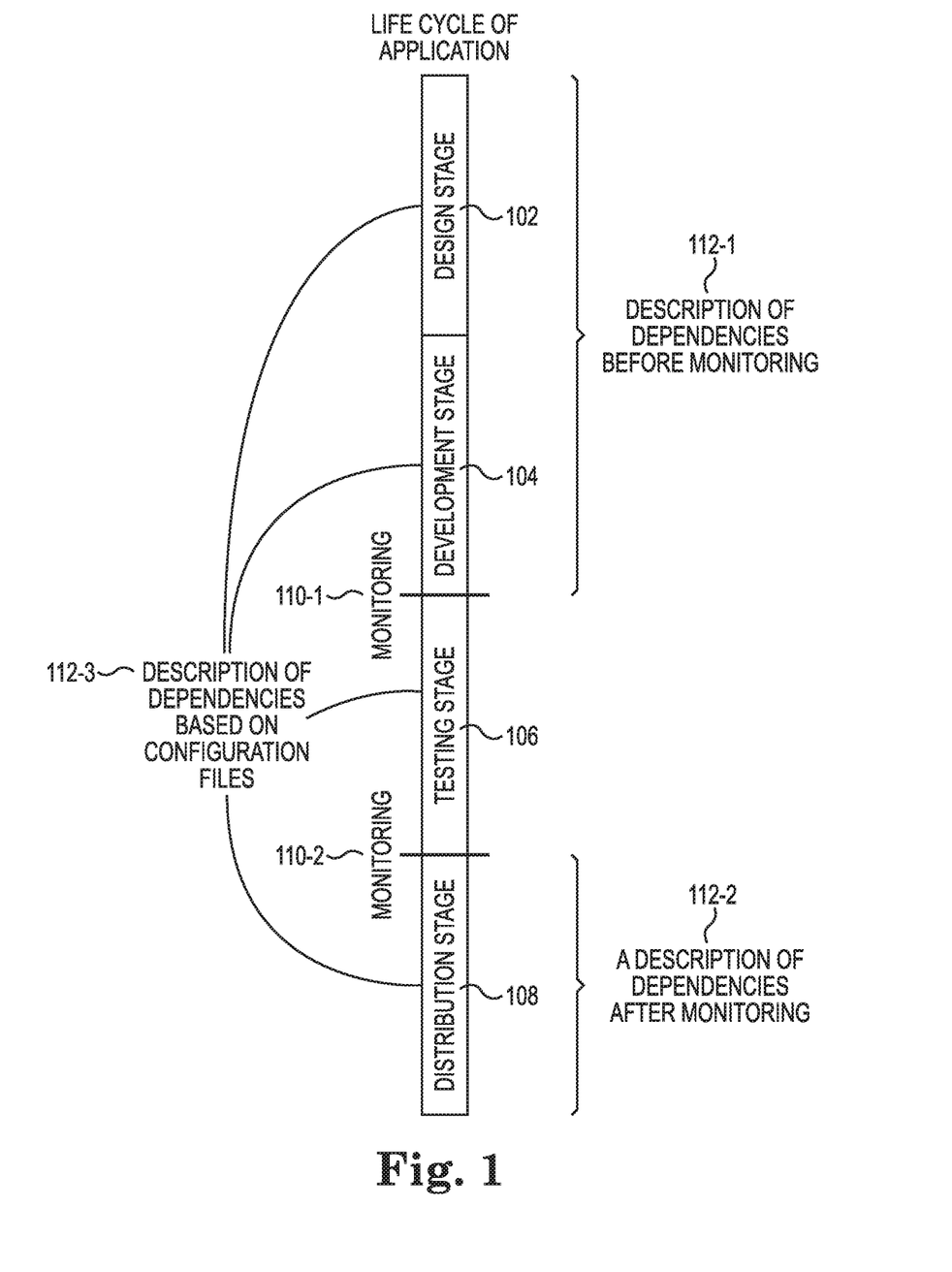
FIG. 1 is a diagram illustrating an example of a number of dependency descriptions according to the present disclosure.

FIG. 1 is a diagram illustrating an example a number of dependency descriptions according to the present disclosure. FIG. 1 includes a design stage 102, a development stage 104, a testing stage 106, and a distribution stage 108. FIG. 1 also describes when a number of descriptions of a number of dependencies can be created.

A design stage 102 of an application can include the conception and the creation of a design for an application. A design of an application can define a number of dependencies that are associated with an application. For example, an application that offers Internet related services, e.g., a first service, can be dependent on a database, e.g., a second service, to store user information or a first component of an application that provides a login service can be dependent on a second component of the application that provides graphical user interface (GUI) services. A design of the Internet related application can defines the application's dependency on a database. A design of a first component of an application can define the first component's dependency on a second component of the application. An application design can be a description of the dependency. A description can be a file that describes a dependency between a number of applications, e.g., Internet related application and database application, a number of services, and/or a number of application components.

A development stage 104 can include the creation of an application. For example, in the development stage 104 a programmer, e.g., IT personnel that creates the application, can create the MRI that are associated with the application. During the creation of the MRI, e.g., application, a programmer can include a number of dependencies in the MRI. For example, during the development of an application a programmer can include instructions in the MRI that define a dependency on a different application, a different service, and/or different components of the application. A file that includes the MRI can be a description of a number of dependencies. In a number of examples, a programmer can annotate the dependencies in a separate file, e.g., separate from the MRI, wherein the second file is a description of the dependencies.

A testing stage 106 can include the testing of the application to determine whether the application functions according to an expected behavior. During the testing stage 106 a state of an application can undergo a number of changes. Changes that are made to an application during the testing stage 106 of the application's life cycle can be classified as changes made during the development stage 104. For example, during the testing stage 106 an error, e.g., portion of the MRI that does not function according to the expected behavior of the application, can be detected. After the detection of the error, the application can re-enter the development stage 104 wherein the changes are made. The application can re-enter the testing stage 106 once the error has been corrected.

An application can be first monitored 110-1 during the testing stage 106. The first monitoring 110-1 of an application during the testing stage can identify a number of un-expected behavior's in the application. In a testing stage 106, the monitoring can be performed by an IT personnel that performs a number of tests on the application and/or by a computing device that determines whether the application functions properly. A computing device can determine that the application functions properly by monitoring a number of metrics that are associated with the application. A number of metrics can include a central processing unit (CPU) usage, a memory usage, and/or a network usage, among other metrics.

A distribution stage 108 can include the distribution of the application to a consumer, e.g., user. That is, the design stage 102, the development stage 104, and the testing stage 106 can result in a finished application which can be distributed to a customer during a distribution stage 108. After the distribution stage 108, the application can be monitored, e.g., second monitoring 110-2. The information gathered during the monitoring of the application can be sent to IT personnel in the form of events.

In a number of previous approaches, a description of a number of dependencies between a number of applications was created during the during the distribution stage 108. The description of the dependencies can be gathered through a reverse engineering process. A reverse engineering process can formulate the dependencies by observing how the application functions during an execution of the application, e.g., MRI, without referencing the design of the application and/or the MRI that are associated with the application. For example, if a first application consistently sends network traffic to the same IP address, then there is a probability that there is a dependency between a second application that receives Internet traffic at the IP address and the first application. However, reverse engineering does not guarantee a dependency but rather describes a likelihood that a dependency exists between two applications.

In a number of examples, a first description 112-1 of dependencies between a number of applications, the number of services, and/or between components of an application can be created before the first monitoring 110-1 and the second monitoring 110-2. For example, the first description 112-1 of the dependencies can be created during a design stage 102 and/or during a development stage 104 before the first monitoring 110-1 and/or the second monitoring 110-2 of the application takes place. The second description 112-2 of the dependencies can be created after the first monitoring 110-1 and/or the second monitoring 110-2 of the application takes place. For example, the second description 112-2 can be created from a reverse engineering process.

In a number of examples, a third description 112-3 of the dependencies between a number of applications can be created based on a number of configuration files. A configuration file can provide an application with information needed by the application to function. Configuration files can be, for example, runtime configuration files. That is, at execution of the application the application can reference the configuration file to obtain settings that can be used by the application. For example, a web server application can be associated with a configuration file that defines an IP address that can be associated with the web server application. A configuration file can be conceived at a design stage 102. A configuration file can be created at a development stage 104. A configuration file can be referenced at a testing stage 106 and/or at a distribution stage 108. The configuration file can be a third description 112-3 of a number of dependencies.

The first description 112-1 of the dependencies that is created before the second monitoring 110-2 and the third description 112-3 that is created based on a configuration file can be more reliable than a second description 112-2 of the dependencies that is created after the second monitoring 110-2. The first description 112-1 created before the second monitoring 110-2 can be created by IT personnel that designed of the application and/or a programmer of the application. The third description 112-3 is based on a configuration file that was also created by a programmer and/or IT personnel that designed the application. That is, the first description 112-1 and the third description 112-3 can be created by IT personnel that have a knowledge of how the application functions because the IT personnel designed and/or created the application. A second description 112-2 can be less reliable than a first description 112-1 because the second description 112-2 is created based on a probability and/or an observation and not on knowledge of a design of the application.

The first description 112-1 of the dependencies created before the second monitoring 110-2 of the application, the second descriptions 112-2 created after the second monitoring 110-2 of the application, and/or the third description 112-3 of the dependencies based on a configuration file can be used together to determine a number of dependencies between a number of applications, a number of services, and/or a number of components of an application. For example, if there is an equal probability based on a second description 112-2 that a dependency exists between a first application and a second application as compared to the probability that the dependency exists between the first application and a third application, then the first description 112-1 and the third description 112-3 can be used as a tie-breaker. Other derivations of the use of the three descriptions can be used to determine whether there is a dependency between a number of applications.

Figure 2:
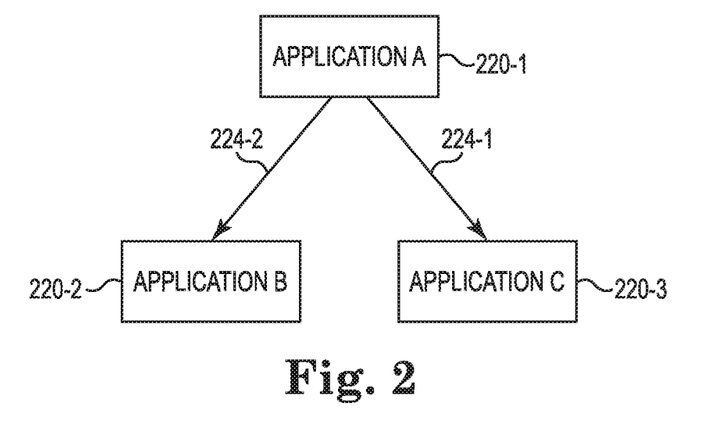
FIG. 2 is a diagram illustrating an example of a number of dependencies according to the present disclosure.

FIG. 2 is a diagram illustrating an example of a number of dependencies according to the present disclosure. FIG. 2 includes a first application 220-1, a second application 220-2, and a third application 220-3, e.g., referred to generally as applications 220. In a number of examples, the first application 220-1, the second application 220-3, and/or the third application 220-3 can represent a first application component, a second application component, and/or a third application component, respectively. The first application 220-1, the second application 220-3, and/or the third application 220-3 can represent a first service, a second service, and/or a third service, respectively.

A second application 220-2 can be dependent on a first application 220-1. A third application 220-3 can be dependent on a first application 220-1. In FIG. 2, a dependency 224-1 between the third application 220-3 and the first application 220-1 is represented by the line connecting the third application 220-3 and the first application 220-1. A dependency 224-2 between the second application 220-2 and the first application 220-1 is represented by the line connecting the second application 220-2 and the first application 220-1.

A dependency between the second application 220-2 and the third application 220-3 can be an indirect dependency. That is, a dependency between the second application 220-2 and the third application 220-3 can be defined by a dependency of the second application 220-2 and the third application 220-3 on the first application 220-1. For example, a dependency between the second application 220-2 and the third application 220-3 can include a dependency of the second application 220-2 on first application 220-1 and a dependency of the third application 220-3 on the first application 220-1.

A dependency, e.g., dependency 224-1 and/or dependency 224-2, can be associated with un-expected behavior. For example, an error and/or un-expected behavior in the first application 220-1 can cause an error and/or un-expected behavior in the second application 220-2 even through the second application 220-2 does not have an error in the MRI that are associated with the second application 220-2 and/or in an computing device associated with the second application 220-2. Resolving the error and/or addressing the un-expected behavior in the first application 220-1 can correct and/or resolve the un-expected behavior in the second application 220-2.

Figure 3:
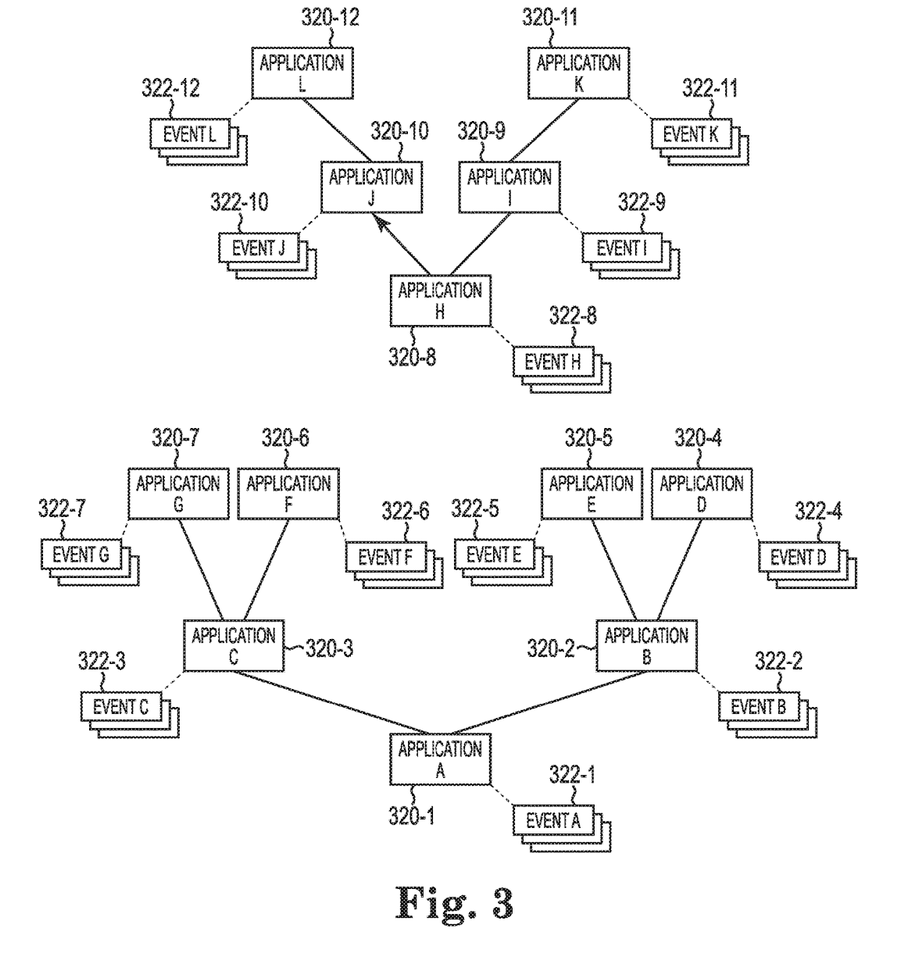
FIG. 3 is a diagram illustrating an example of a number of events according to the present disclosure.

FIG. 3 is a diagram illustrating an example of a number of events according to the present disclosure. FIG. 3 includes a number of applications 320-1, 320-2, 320-3, 320-4, 320-5, 320-6, 320-7, 320-8, 320-9, 320-10, 320-11, and 320-12, e.g., referred to generally as applications 320. In FIG. 3 a dependency between applications is represented by a line connecting the applications. For example, a dependency between the first application 320-1 and the second application 320-2 is represented by the line connecting the first application 320-1 and the second application 320-2. In a number of examples, the number of applications 320 can represent, a number of services, and/or a number of application components and the number of dependencies between the different applications can represent dependencies between services, and/or dependencies between components of an application.

In a number of examples, dependencies between applications, services, and/or components of an application can be nested. For example, a seventh application 320-7 can depend on the first application 320-1 because the seventh application 320-7 depends on the third application 320-3 which depends on the first application 320-1.

A number of events 322-1, 322-2, 322-3, 322-4, 322-5, 322-6, 322-7, 322-8, 322-9, 322-10, 322-11, 322-12, e.g., referred to generally as events 322, can be associated with the applications 320. A monitoring service can create an event that is associated with one of the applications 320 when the applications 320 exhibit un-expected behavior. For example, a number of first events 322-1 can be created when a first application 320-1 requires higher CPU usage than expected.

An un-expected behavior can be defined by an upper threshold value and/or a lower threshold value. For example, a second application 320-2 can exhibit un-expected behavior when the application 320-2 uses 20 gigabytes (GB) of network traffic in an hour and when a threshold value of usage includes a lower threshold value of 5 GB and a higher threshold value of 10 GB of network traffic in an hour. That is, the second application 320-2 exhibits un-expected behavior because the second application 320-2 used more than 10 GB of network traffic in an hour.

The expected behavior of the second application 320-2 can be monitored by monitoring a number of computing devices that are associated with the second application 320-2. For example, a computing device that executes the MRI that defines the second application 320-2 can be monitored by determining the CPU usage of the computing device.

In FIG. 3, the seventh application 320-7 and the sixth application 320-6 are dependent on the third application 320-3, the fifth applications 320-5 and the fourth application 320-4 are dependent on the second application 320-2, and the second application 320-2 and the third application 320-3 are dependent on the first application 320-1. The twelfth application 320-12 is dependent on the tenth application 320-10, the eleventh application 320-11 is dependent on the ninth application 320-9, and the ninth application 320-9 and the tenth application 320-10 are dependent on the eighth application 320-8. Resolving an un-expected behavior in the first application 320-1 can resolve the un-un-expected behavior in the seventh application 320-7 but not the un-expected behavior in the twelfth application 320-12, for example, because the twelfth application 320-12 does not depend from the first application 320-1.

A number of descriptions can define the number of dependencies. For example, a first description of a first number of dependencies can define the dependencies between the applications 320-1, 320-2, 320-3, 320-4, 320-5, 320-6, and 320-7, while a second description of a second number of dependencies can define the dependencies between the applications 320-8, 320-9, 320-10, 320-11, and 320-12.

In a number of examples, a first description can define a dependency between the first application 320-1 and third application 320-3 while a second description can define a dependency between the seventh application 320-7 and the third application 320-3. The first description and the second description can be joined and/or referenced together to define a dependency of the seventh application 320-7 on the first application 320-1.

The events 322 can be sent to IT personnel. The IT personnel can identify a root-cause of the un-expected behavior associated with the applications 320. However, the IT personnel's ability to identify a root-cause is diminished as the events 322 associated with the un-expected behavior grow.

In a number of examples, a first description of the dependencies between the seventh application 320-7 and the sixth application 320-6 can be created after the monitoring of the seventh application 320-7 and the sixth application 320-6 began. The first description of the dependencies can determine that the applications are equally likely to be dependent from the first application 320-1 or the eighth application 320-8. A second description of the dependencies between the seventh application 320-7 and the sixth application 320-6 can be created before the monitoring of the seventh application 320-7 and the sixth application 320-6. The second description can identify the seventh application 320-7 and the sixth application 320-6 as being dependent on the first application 320-1. The second description can be used to determine whether the seventh application 320-7 and the sixth application 320-6 depend from the first application 320-1 or the eighth application 320-8. That is, the first description of the dependencies and the second description of the dependencies can be used to identify that the sixth application 320-6 and the seventh application 320-7 depend from the first application 320-1.

In a number of examples, a number of descriptions of a number of dependencies can be created by different sources. For example, an IT personnel, e.g., first source, that designed the seventh application 320-7 can create a first description of the dependency of the seventh application 320-7 on the third application 320-3, while a programmer, e.g., second source, that developed the third application 320-3 can create a second description of the dependency of the third application 320-3 on the first application 320-1. The descriptions of dependencies from different sources can be sent to an IT personnel to assist the IT personnel in identifying a number of dependencies.

Figure 4:
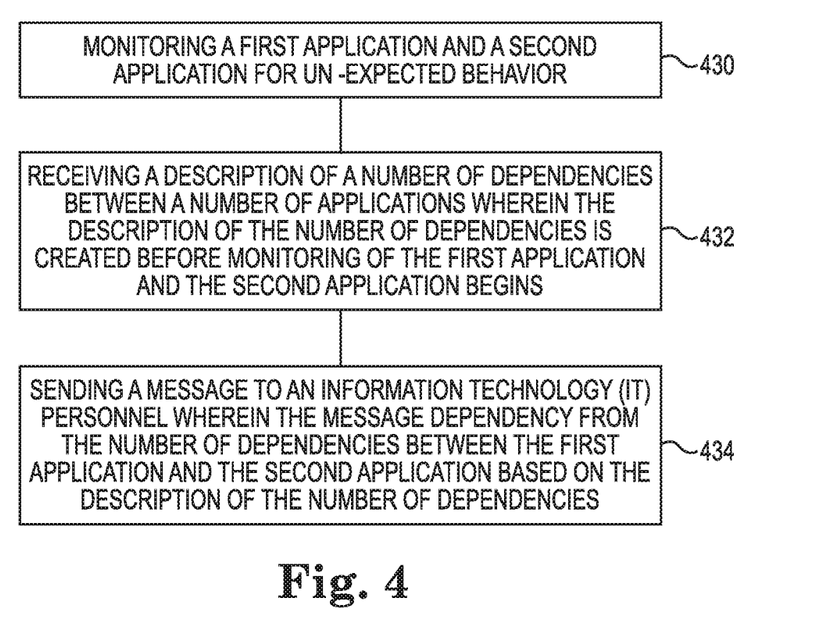
FIG. 4 is a flow chart illustrating an example of a method for dependency monitoring according to the present disclosure.

FIG. 4 is a flow chart illustrating an example of a method for dependency monitoring according to the present disclosure. At 430, a first application and a second application can be monitored for un-expected behavior. Un-expected behavior can be caused by an error in the first application, the second application, and/or a different application. For example, un-expected behavior associated with a first application can be caused by an error in the first application when the cause of the un-expected behavior is not dependent on the second application and/or the different application. Un-expected behavior associated with a first application can be caused by an error in the second application when the first application depends from the second application. Un-expected behavior associated with a first application and a second application can be caused by an error in the different application when the first application and the second application depend on the different application.

At 432, a description of a number of dependencies between a number of applications is received, wherein the description of the number of dependencies is created before monitoring of the first application and the second application begins. A description of the number of dependencies between the number of application that is created at a design stage and/or a development stage can be a description that is created before the monitoring of the first application and the second application begins. A monitoring of an application can only begin when the application exists, e.g., after the application has been developed.

At 434, a message can be sent to an IT personnel, wherein the message identifies a dependency from the number of dependencies between the first application and the second application based on the description of the number of dependencies. The message can also group a portion of the un-expected behavior when a root cause of the un-expected behavior is based on a dependency between the first application and the second application. Grouping a portion of the un-expected behavior can allow an IT personnel to focus on addressing un-expected behavior based on the dependency and not each of the un-expected behaviors that caused the number of notifications individually.

Figure 5:
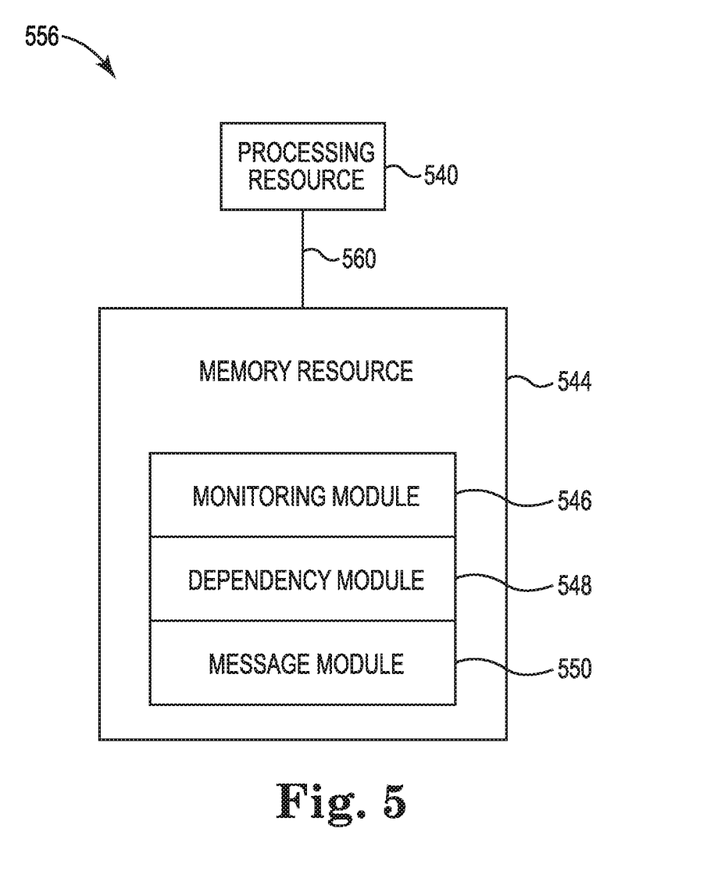
FIG. 5 is a diagram illustrating an example of a computing system according to the present disclosure.

FIG. 5 is a diagram illustrating an example of a computing system according to the present disclosure. The computing system 556 can utilize software, hardware, firmware, and/or logic to perform a number of functions.

The computing system 556 can be a combination of hardware and program instructions configured to perform a number of functions, e.g., actions. The hardware, for example, can include one or more processing resources 540 and other memory resources 544, etc. The program instructions, e.g., machine-readable instructions (MRI), can include instructions stored on memory resource 544 to implement a particular function, e.g., an action such as dependency based event grouping.

The processing resources 540 can be in communication with the memory resource 544 storing the set of MRI executable by one or more of the processing resources 540, as described herein. The MRI can also be stored in a remote memory managed by a server and represent an installation package that can be downloaded, installed and executed. A computing device 556, e.g., server, can include memory resources 544, and the processing resources 540 can be coupled to the memory resources 544 remotely in a cloud computing environment.

Processing resources 540 can execute MRI that can be stored on internal or external non-transitory memory 544. The processing resources 540 can execute MRI to perform various functions, e.g., acts, including the functions described herein among others.

As shown in FIG. 5, the MRI can be segmented into a number of modules, e.g., a monitoring module 546, a dependency module 548, and a message module 550, that when executed by the processing resource 540 can perform a number of functions. As used herein a module includes a set of instructions included to perform a particular task or action. The number of modules 546, 548, and 550, can be sub-modules of other modules. For example, the monitoring module 546 and the dependency module 548 can be sub-modules and/or contained within a single module. Furthermore, the number of modules 546, 548, and 550 can comprise individual modules separate and distinct from one another.

In the example of FIG. 5, a monitoring module 546 can comprise MRI that are executed by the processing resources 540 to monitor a number of applications, a number of services, and/or a number of components of an application. A computing device that monitors the applications, the services and/or the components of an application can also monitor a number of computing devices that are associated with the application, the services, and/or the components of an application. A computing device can be associated with an application when the application is being executed on the computing device, when the application sends information through a communication link to the computing device, among other associations between the computing device and the application. A computing device that monitors the application can create a number of events that identify un-expected behavior that is associated with an application, services, and/or components of the application. A number of events that are associated with different applications, services, and/or components of an application can be caused by an error in a single application. For example, an error in a first application can cause un-expected behavior in a second application and a third application, an error in the first service can cause an un-expected behavior in the second service and a third service, and/or an error in the first application can cause an un-expected behavior in a first component of a second application and a second component of the second application.

A dependency module 548 can comprise MRI that are executed by the processing resources 540 to describe a number of dependencies between a number applications, a number of services, and/or a number of components of an application. A dependency between the first application and the second application, the first service and the second service, and/or the first application component and the second application component can be a direct dependency and/or an indirect dependency. A direct dependency can include, for example, a first application that depends directly from a second application, a first service that depends directly from a second service, and/or a first application component that depends directly from a second application component. An indirect dependency can be, for example, a first application that depends from a third application that depends from a second application, a first service that depends from a third service that depends from a second service, and/or a first application component that depends from a third application component that depends from a second application component. An indirect dependency between the first application and the second application can also exist when the first application and the second application depend on a third application. An indirect dependency between the first service and the second service can also exists when the first service and the second service depend on a third service. An indirect dependency between the first application component and a second application component can also exists when the first application component and the second application component depend on a third application component. The dependencies can be expressed in a description of the dependencies. A description of the dependencies can be a file that expresses the dependencies. A description of the dependencies can also be a database that stores information on the dependencies. The description of the dependencies that is created before the application is developed and/or designed can be a description of the dependencies that is created before the application is monitored.

A message module 550 can comprise MRI that are executed by the processing resources 540 to send a message to an IT personnel identifying the dependencies. A message can provide IT personnel with access to the event and/or the description of the dependencies based on which the events are grouped.

A memory resource 544, as used herein, can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), etc., as well as other types of computer-readable media.

The memory resource 544 can be integral or communicatively coupled to a computing device in a wired and/or wireless manner. For example, the memory resource 544 can be an internal memory, a portable memory, and a portable disk, or a memory associated with another computing resource, e.g., enabling MRIs to be transferred and/or executed across a network such as the Internet.

The memory resource 544 can be in communication with the processing resources 540 via a communication path 560. The communication path 560 can be local or remote to a machine, e.g., a computer, associated with the processing resources 540. Examples of a local communication path 560 can include an electronic bus internal to a machine, e.g., a computer, where the memory resource 544 is one of volatile, non-volatile, fixed, and/or removable storage medium in communication with the processing resources 540 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 560 can be such that the memory resource 544 is remote from a processing resource, e.g., processing resources 540, such as in a network connection between the memory resource 544 and the processing resource, e.g., processing resources 540. That is, the communication path 560 can be a network connection. Examples of such a network connection can include local area network (LAN), wide area network (WAN), personnel area network (PAN), and the Internet, among others. In such examples, the memory resource 544 can be associated with a first computing device and the processing resources 540 can be associated with a second computing device, e.g., a Java® server. For example, processing resources 540 can be in communication with a memory resource 544, wherein the memory resource 544 includes a set of instructions and wherein the processing resources 540 are designed to carry out the set of instructions.

As used herein, "logic" is an alliterative or additional processing resource to perform a particular action and/or function, etc., described herein, which includes hardware, e.g., various forms of transistor logic, application specific integrated circuits (ASICs), etc., as opposed to computer executable instructions. e.g., software firmware, etc., stored in memory and executable by a processor.

As used herein, "a" or "a number of" something can refer to one or more such things. For example, "a number of widgets" can refer to one or more widgets.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

What is claimed:

1. A method comprising:
    identifying, by a system comprising a processor, an un-expected or an abnormal behavior in a first application and an un-expected or an abnormal behavior in a second application;
    creating, by the system, a first event associated with the identified un-expected or abnormal behavior in the first application;
    creating, by the system, a second event associated with the identified un-expected or abnormal behavior in the second application;
    accessing, by the system, a first description, a second description, and a third description of a plurality of dependencies between a plurality of applications, wherein the first description is created at a design or a development stage of the first application and the second application, the second description is created during a testing stage of the first application, and the third description is created from run-time configuration files that are associated with the first application and the second application;
    determining, by the system, whether there is a dependency between the first application and the second application based on a dependencies identified in at least two of the accessed first description, second description, and third description of the plurality of dependencies;
    in response to a determination that there is a dependency between the first application and the second application, grouping, by the system, the first event and the second event; and
    outputting, by the system, the first event and the second event together as a group according to the grouping.

2. The method of claim 1, wherein the dependency between the first application and the second application is based on a dependency between the first application and a third application and a dependency between the second application and the third application.

3. The method of claim 2, wherein the dependency between the first application and the second application is an indirect dependency, the dependency between the first application and the third application is a direct dependency, and the dependency between the second application and the third application is a direct dependency.

4. The method of claim 1, further comprising:
    in response to a determination that there is no dependency between the first application and the second application, outputting the first event and the second event separately with respect to each other.

5. The method of claim 1, wherein determining whether there is a dependency between the first application and the second application further comprises determining whether there is a dependency between the first application and the second application by using the plurality of dependencies identified in each of the first description, the second description, and the third description.

6. The method of claim 1, wherein the first description and the third description are created based on configuration files and the second description is created based on a probability and/or an observation of the first application and the second application.

7. The method of claim 1, wherein determining whether there is a dependency between the first application and the second application further comprises:
    determining that the second description indicates an equal probability that a dependency exists between the first application and the second application; and
    using at least one of the first description and the third description as a tie-breaker in determining whether a dependency between the first application and the second application exists.

8. A non-transitory machine-readable medium storing instructions executable by a machine to cause the machine to:
    monitor a first application component and a second application component that are part of a same application, the monitoring producing a first event associated with the first application component and producing a second event associated with the second application component;
    access a first description of a first plurality of dependencies between a plurality of application components of the same application, wherein the first description of the first plurality of dependencies is created before the first application component and the second application component are monitored;
    access a second description of a second plurality of dependencies, wherein the second description of the second plurality of dependencies is created after the first application component and the second application component are monitored;
    identify a dependency between the first application component and the second application component, wherein the dependency is based on the first plurality of dependencies and the second plurality of dependencies;
    group the first event associated with the first application component and the second event associated with the second application component based on the identified dependency; and
    output the first event and the second event together as a group according to the grouping.

9. The non-transitory machine-readable medium of claim 8, wherein the instructions are executable to cause the machine to receive a third description of a third plurality of dependencies created from run-time configuration files that are associated with the first application component and the second application component,
    wherein the dependency between the first application component and the second application component is further identified based on the third plurality of dependencies.

10. The non-transitory machine-readable medium of claim 9, wherein the instructions are further executable to cause the machine to identify the dependency based on a combination of dependencies identified in at least two of the first description, the second description, and the third description.

11. The non-transitory machine-readable medium of claim 8, wherein the instructions are executable to cause the machine to send a message to information technology (IT) personnel identifying the dependency between the first application component and the second application component.

12. The non-transitory machine-readable medium of claim 8, wherein the first description is created at a design stage of the first application component and the second application component before a development stage of the first application component and the second application component.

13. The non-transitory machine-readable medium of claim 8, wherein the first description is created at a development stage of the first application component and the second application component.

14. The non-transitory machine-readable medium of claim 8, wherein the second description of the second plurality of dependencies is created based on observing functions of the first and second application components during execution of the first and second application components.

15. The non-transitory machine-readable medium of claim 8, further comprising:
   in response to a determination that there is no dependency between the first application and the second application, outputting the first event and the second event separately with respect to each other.

16. A system comprising:
   a processor; and
   a non-transitory storage medium storing instructions executable on the processor to:
      receive a first event associated with a first service and a second event associated with a second service;
      receive a first description of a first plurality of dependencies, wherein the first description of the first plurality of dependencies is created after the monitoring of the first service and the monitoring of the second service begins;
      identify a first dependency, from the first plurality of dependencies, wherein the first dependency is a dependency of the first service and the second service on a third service;
      identify a second dependency, from the first plurality of dependencies, wherein the second dependency is a dependency of the first service and the second service on a fourth service;
      determine whether there is a dependency between the first service and the second service based on the first description of the first plurality of dependencies and a second description of a second plurality of dependencies, wherein the second description is created before a monitoring of the first service and a monitoring of the second service begins;
      group the first event associated with the first service and the second event associated with the second service based on the selected dependency; and
      output the first event and the second event together as a group according to the grouping.

17. The system of claim 16, wherein the second description of the second plurality of dependencies is created at a design stage during which a design of the first and second services is conceived.

18. The system of claim 16, wherein the second description of the second plurality of dependencies is created at a development stage during which machine-readable instructions for the first and second services are created, wherein the second plurality of dependencies are included in the machine-readable instructions.

19. The system of claim 16, wherein the second description of the second plurality of dependencies is created at a testing stage during which the first and second services are tested, and wherein the second plurality of dependencies are updated based on changes to machine-readable instructions of the first and second services resulting from the testing.

20. The system of claim 16, wherein the instructions are further executable on the processor to:
   receive a third description of a third plurality of dependencies, created from run-time configuration files that are associated with the first service and the second service; and
   select the dependency among the among the first dependency and the second dependency based on a combination of dependencies identified in at least two of the first description, the second description, and the third description.

* * * * *